Dec. 12, 1972    L. J. JACOVIDES ET AL    3,705,971
INDUCTION MOTOR FABRICATION METHOD
Filed Aug. 13, 1970

INVENTORS
Linos J. Jacovides,
David M. Lyon &
BY Richard M. Fischer

C. R. Meland
ATTORNEY

United States Patent Office 3,705,971
Patented Dec. 12, 1972

3,705,971
INDUCTION MOTOR FABRICATION METHOD
Linos J. Jacovides, Troy, Mich., and David M. Lyon, La Grange, and Richard M. Fischer, Naperville, Ill., assignors to General Motors Corporation, Detroit, Mich.
Filed Aug. 13, 1970, Ser. No. 63,451
Int. Cl. B23k 15/00
U.S. Cl. 219—121 EM
2 Claims

ABSTRACT OF THE DISCLOSURE

A method for fabricating a squirrel cage rotor for an AC induction motor. In this fabrication method, a rotor core made of magnetic laminations is provided with copper conductor bars protruding beyond the respective ends of the core body and copper end rings positioned to abut the ends of the conductor bars at the respective ends of the core body. Each conductor bar is fused to its respective end rings by electron beam welding wherein an electron beam is focused on areas of the conductor bar and the end ring adjacent the conductor bar for a time sufficient to fuse the two members.

---

This invention relates to a method for securing the ends of the conductor bars of a squirrel cage rotor of an AC induction motor to a conductive end ring.

Conventional squirrel cage rotor fabrication methods utilize soldering, brazing, resistance welding, or flame welding to secure the rotor's conductor bars to its conductive end rings. Inasmuch as these conventional methods rely on surface heating and thermal conductivity for propagation of heat into the material to accomplish fusion over a great area, annealing of the end ring and conductor bar materials is an unavoidable accompaniment of the securing process. Consequently, high conductivity hardened copper or copper alloys such as silver bearing copper have generally been limited to the fabrication of rotor elements which are not subjected to high mechanical stresses during motor operation. These materials are unsuitable because of the extensive annealing and concomitant weakening associated with conventional fabrication processes. The annealed members are unable to withstand the forces encountered in the course of motor operation.

Copper and copper alloys with their high electrical conductivity are particularly suited as materials for squirrel cage rotor conductor bars and end rings. In the past, when copper or copper alloys were used to fabricate rotors which develop high mechanical stresses, the extensive annealing, noted above, has necessitated the inclusion of steel rings to retain the copper end rings. In contrast with prior art fabrication techniques, this invention contemplates securing the conductor bars to the end rings by means of electron beam welding. Electron beam welding affords a method for fusion of conductor bars to conductive end rings with a minimum of material heating. Accordingly, a high strength high hardness copper alloy such as silver bearing copper is a suitable material for the conductor bar and end ring members in the fabrication method of the present invention.

The electron beam welding technique of the fabrication method of this invention relies on direct transfer of energy from a narrow collimated high intensity electron beam to form a narrow highly heated channel along the line of incidence. In this manner, the entire direct heated fusion volume of the weld is heated concurrently and annealing which would accompany heat conduction to the remaining volume of the components is minimized. Reference should be made to Patent 2,987,610 Steigerwald for further details concerning the general principles involved in electron beam welding.

To facilitate electron beam welding in the present invention, copper spacers are placed intermediate pairs of conductor bars to permit a continuous weld to be made around the entire circumference of the end rings. In this arrangement, the electron beam is focused on the outer edge of the copper-copper interface between the end ring and the combination of the spacers and conductor bars and the rotor is rotated at a speed suitable to create a continuous weld.

Accordingly, it is an object of the present invention to secure the ends of the conductor bars of a squirrel cage rotor of an AC induction motor to a conductive end ring by focusing an electron beam into contiguous areas of each conductor bar and the end ring for a time sufficient to fuse the conductor bar to the end ring.

A further object of the present invention is to provide a method for securing the ends of copper conductor bars of a squirrel cage rotor of an AC induction motor to a copper end ring by focusing an electron beam onto contiguous areas of each conductor bar and the end ring and rotating the rotor to cause the focused electron beam to impinge each conductor bar for a time sufficient to fuse each conductor bar to the end ring.

Still another object of the present invention is to provide a method for securing the ends of copper conductor bars of a squirrel cage rotor of an AC induction motor to a copper end ring wherein copper spacers are placed intermediate the conductor bars to provide a continuous copper-copper interface around the circumference of the end ring by focusing an electron beam onto the outer edge of the copper-copper interface and areas on either side of the interface and rotating the rotor to continuously fuse the end ring to both the conductor bars and the copper spacers.

Further objects and advantages of this invention will be apparent from the following description, reference being had to the accompanying drawings wherein a preferred embodiment of the invention is clearly shown.

Figure 1:
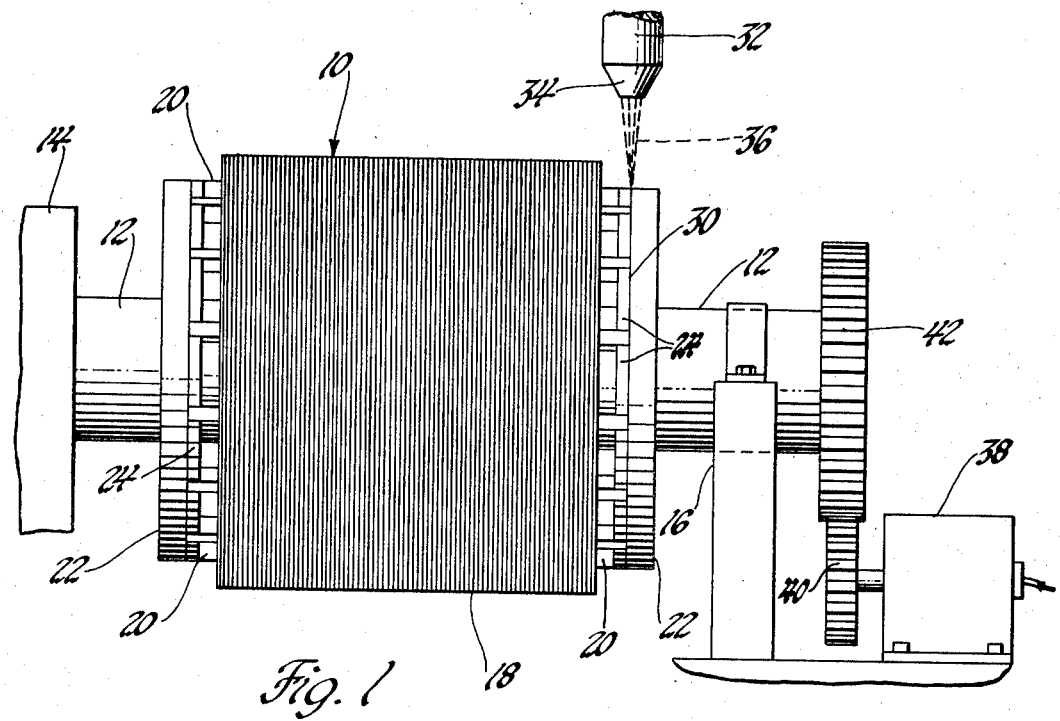
FIG. 1 is a view of a squirrel cage rotor being electron beam welded in accordance with the present invention.

Referring now to the drawings and more particularly to FIG. 1, a squirrel cage rotor 10 is shown with its shaft 12 journalled for rotation at its respective ends in a fixture which includes mounting members 14 and 16. As shown in the figure, the squirrel cage rotor 10 is comprised of a laminated rotor core 18 whose laminations are made of magnetic material, for example, magnetic iron.

Figure 2:
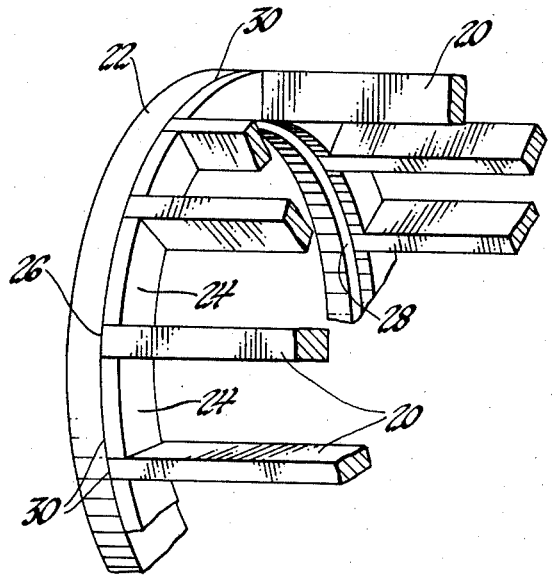
FIG. 2 is a view in isometric projection showing the arrangement of the squirrel cage rotor's copper conductor bars, the copper spacers, and the copper end ring.

The laminations which form the rotor core 18 are provided with a plurality of circumferentially spaced apart elongated slots or apertures which are axially aligned and extend the entire axial length of the rotor core 18 for carrying the conductor bars 20. The conductor bars 20 are made of hardened conductive material. Silver bearing copper which has been hardened to a hardness reading on the Rockwell $R_F$ scale on the order of 75 is a suitable conductive material and the following discussion is in terms of conductor bars made from that material. Two identical end rings 22 are positioned in abutting engagement with the protruding ends of the conductor bars 20 at opposing ends of the rotor core 18. These end rings are also made of silver bearing copper in the preferred squirrel cage rotor. A plurality of silver bearing copper spacer elements 24 are provided with the rotor of FIG. 1. These spacer elements 24 can have either a curved design conforming to the curvature of end ring 22 or they may be rectangular in shape having straight edges. For large rotor applications, the difference is incidental inasmuch as the curvature is slight. One of the spacers 24 is placed intermediate each pair of conductor bars 20 as is shown in FIG. 2. In this manner, it should be appreciated that a continuous circumferential copper surface is provided which includes the spacers 24 and the conductor bars 20. The diameter of the copper surface of the conductor bar spacer combination is substantially the same as the diameter of the end ring 22.

A conventional clamping means (not shown) is used to retain the end rings 22 in the proper relationship with the ends of the conductor bars 20. The spacers 24 are secured by a friction fit with the conductor bars 20 prior to welding. A cooling coil (not shown) can be included with the clamping means if it is necessary to provide auxiliary cooling of the end rings 22.

The end ring arrangement is readily comprehended with reference to FIG. 2. As shown there in isometric projection, the conductor bars 20 are placed normal to the end ring 22 and are in abutting engagement with it. It is noted that at the abutment each of the conductor bars has an intersection curve circumscribing the copper-copper interface between the particular conductor bar and the end ring. In the example of FIG. 2 wherein the conductor bars have a rectangular configuration, this intersection curve comprises a broken line having four straight line components. These four straight line components are the perimeter of the conductor bar. In particular, one portion 26 of the intersection curve of each of the conductor bars is substantially at the outer circumference of the end ring 22. It is noted that a second portion 28 of the intersection curve is located at the interior of the conductor bar 20— end ring 22 abutment and is substantially parallel with the portion 26. It should be appreciated that the intersection curve is completed by the two remaining lines which complete the perimeter of the rectangular conductor bars. If conductor bars of other geometries were employed, it is understood that the intersection curve would vary accordingly.

One of the spacers 24 is placed intermediate each pair of the conductor bars 20. As noted above, these spacers complement the conductor bars to provide a substantially continuous circumferential copper surface comprised alternately of conductor bars and spacers. The combination of spacers 24 and conductor bars 20 provides an annular ring for engagement with the end ring 22. Accordingly, a copper-copper interface results between the copper end ring and the copper surface of the conductor bar-spacer annulus. This copper-copper interface has an exterior curve or edge 30 at the circumference of the end ring 22 which includes the portions 26 of the conductor bar intersection curves and which extends continuously around the end ring 22 as shown in FIG. 2.

Referring again to FIG. 1, a conventional electron beam welding machine 32 is shown which includes means 34 for focusing electron beam 36 for proper impingement of the workpiece target which is comprised of the members to be welded. Specifics of the electron beam welding machine and the process of electron beam welding are generally known in the welding art. Patent 2,987,610 Steigerwald discloses the principles of both the process and the requisite apparatus. The focused electron beam 36 impinges areas of both the end ring 22 and either a condutcor bar 20 or a spacer 24. The electron beam impinges these members at the edge 30 of the copper-copper interface on a line of incidence which is substantially normal to the axis of the rotor 10. The electron beam width along the axis of rotor 10 is on the order of $\frac{1}{16}$ to $\frac{1}{8}$ inch. The intensity of the beam 36 is adjusted to attain the desired weld depth. The welding process can be carried forward either with or wtihout a vacuum according to principles generally known in the art. In the preferred embodiment of the present invention, a high vacuum is drawn to substantially eliminate energy absorption which accompanies an air or other gaseous atmosphere.

Drive motor 38 of FIG. 1 drives gear 40 which is coupled to gear 42 to cause the squirrel cage rotor 10 to rotate. In this manner, the entire circumference of the end ring and copper-copper interface edge is exposed to the electron beam 36. The speed of rotation of the rotor is selected such that the focused electron beam is sustained on each section to be welded for a time sufficient for proper fusion to occur. Welding speeds on the order of 15 circumferential inches per minute are readily obtained in the welding process. The speed, of course, depends on the energy density of the electron beam 36. At a speed of 15 inches per minute, weld penetration depths on the order of 1¼ to 1½ inches can be accomplished with a conventional electron beam welding machine. Thus, it should be appreciated that the present invention is generally applicable for fabricating both small and large rotors. To avoid outgassing during the welding operation, oxygen-free copper should be used to manufacture the various copper components.

Figure 3:
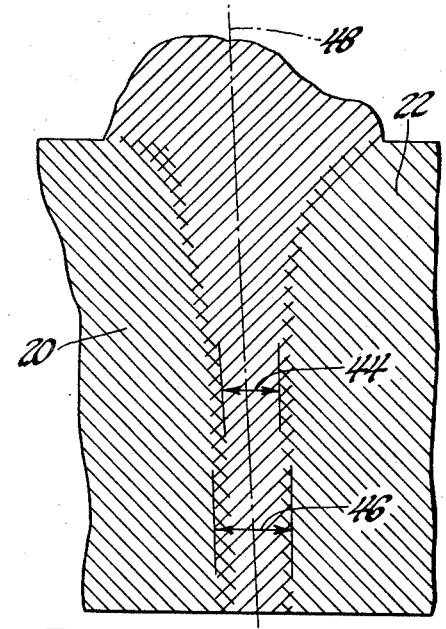
FIG. 3 is an enlarged view in cross section showing the character of the weld resulting from the electron beam welding process of the present invention.

The character of the resultant electron beam weld is shown in FIG. 3. The weld is substantially a long narrow channel having a fusion zone 44 on the order of $\frac{1}{16}$ to $\frac{1}{8}$ inch in width. This fusion zone 44 extends the entire radial depth of the conductor bars to obtain maximum strength and to obtain the optimum conductive connection between the end ring and the bars. Thus, in FIG. 2, the fusion zone 44 would extend from the intersection curve portions 26 to the intersection curve portion 28. Referring again to FIG. 3, the total heat affected zone 46 wherein the copper alloy is appreciably annealed has a width on the order of ¼ inch. The material more distant than ⅛ inch from the center of the colimated electron beam center line 48 has a Rockwell hardness on the order of 80% or more of the original material hardness.

The spacers 24 are included in the rotor arrangement to facilitate the electron beam welding process. If the electron beam is applied around the entire circumference of the end ring 22 without the spacers 24, the high energy electrons are deflected from the end ring 22 and impinge on the rotor core 18. The spacers obviate uncontrolled melting of the end laminations of the core 18 by deflected electrons. The spacers 24 need not be used in particular applications. The electron beam could be extinguished during travel from one conductor bar to the next to prevent heating of laminations by deflected electrons where the spacers are not used. For low energy density electron beams, the effect of deflected electrons may be minimal in which case the spacers may be dispensed with as unnecessary.

We claim:

1. In a method for securing the copper conductor bars of a squirrel cage rotor of an AC induction motor to a copper end ring, the steps comprising: providing a laminated rotor core of magnetic material carrying in circumferentially spaced apart apertures a plurality of copper conductor bars having substantially planar end faces, positioning a separate copper end ring having a planar surface such that said substantially planar end faces of said copper conductor bars abut said planar surface of said end ring in a common plane thereby creating between each conductor bar end face and said end ring an intersection curve defining the perimeter of the area of contact, focusing an electron beam onto at least a portion of each intersection curve and areas of the conductor bar and the end ring contiguous therewith, and rotating said rotor core to bring an intersection curve portion of each conductor bar and end ring into said focused electron beam for a time sufficient to fuse each respective conductor bar to said end ring.

2. In a method for securing the copper conductor bars of a squirrel cage rotor of an AC induction motor to a copper end ring, the steps comprising: providing a laminated rotor core of magnetic material carrying in circumferentially spaced apart apertures a plurality of copper conductor bars having substantially planar end faces, positioning a separate copper end ring having a planar surface such that said substantially planar end faces of said copper conductor bars abut said planar surface of said end ring in a common plane thereby creating between each conductor bar end face and said end ring an intersection curve defining the perimeter of the area of contact, placing copper spacers intermediate said conductor bars to provide a substantially continuous copper-copper interface around the circumference of said end ring, focusing an electron beam onto an edge of said copper-copper interface at the circumference of said end ring and including areas on either side of said interface contiguous therewith, and rotating said rotor core at a speed suitable to continuously fuse said copper end ring to said copper conductor bars and to said copper spacers at the circumference of said end ring.

References Cited

UNITED STATES PATENTS

| | | | |
|---|---|---|---|
| 3,517,238 | 6/1970 | Lake | 310—211 |
| 3,290,526 | 12/1966 | Wren et al. | 310—210 |
| 2,248,167 | 7/1941 | Elsey | 29—598 |
| 2,449,924 | 9/1948 | Aske | 29—598 |
| 2,368,295 | 1/1945 | Goran | 29—598 |
| 2,987,610 | 6/1961 | Steigerwald | 219—121 |
| 2,509,720 | 5/1950 | Britain et al. | 310—211 |

JOSEPH V. TRUHE, Primary Examiner

G. R. PETERSON, Assistant Examiner

U.S. Cl. X.R.

310—164, 211; 29—598